United States Patent [19]
Flot et al.

[11] Patent Number: 4,510,827
[45] Date of Patent: Apr. 16, 1985

[54] WIRE STRIPPING ARRANGEMENT

[75] Inventors: Regis Flot, Eragny, France; Jean Patrick Hine, San Carlos, Calif.

[73] Assignee: Raychem Corporation, Menlo Park, Calif.

[21] Appl. No.: 444,129

[22] Filed: Nov. 24, 1982

[30] Foreign Application Priority Data

Nov. 27, 1981 [GB] United Kingdom .............. 8135940

[51] Int. Cl.³ .............................................. H02G 1/12
[52] U.S. Cl. .................................. 81/9.4; 339/97 R
[58] Field of Search ............ 30/90.1; 81/9.5 R, 9.5 A, 81/9.5 B; 140/123; 29/564.4; 339/95 R, 96, 97 R, 30; 7/107

[56] References Cited

U.S. PATENT DOCUMENTS

| | | | |
|---|---|---|---|
| 2,894,424 | 7/1959 | Vaughan Jr. | 81/9.5 R X |
| 3,110,329 | 11/1963 | Lhomme et al. | 81/9.5 A X |
| 3,526,870 | 9/1970 | Mayala | 339/97 R |
| 3,880,022 | 4/1975 | Miller | 81/9.5 R |
| 4,154,497 | 5/1979 | Donnelly et al. | 339/97 R |
| 4,386,541 | 6/1983 | Robertson et al. | 81/9.5 R |

FOREIGN PATENT DOCUMENTS

| | | | |
|---|---|---|---|
| 1640629 | 10/1969 | Fed. Rep. of Germany | 339/97 R |
| 1579734 | 11/1980 | Fed. Rep. of Germany | 339/30 |

*Primary Examiner*—Frederick R. Schmidt
*Assistant Examiner*—Debra S. Meislin
*Attorney, Agent, or Firm*—Ira D. Blecker; James W. Peterson; Herbert G. Burkard

[57] ABSTRACT

A recoverable arrangement for stripping insulation from an elongate conductor comprises two stripping members each of which has a cut out portion. The cut out portions are arranged to overlap so as to form an aperture to receive the insulated conductor. The arrangement is recoverable such that the stripping members move both laterally of the conductor, to pierce the insulation, and longitudinally of the conductor, to strip the insulation. Preferably the stripping members of a further member in association with the stripping members comprise a heat-recoverable metal which recovers to move the stripping members relative to the conductor.

14 Claims, 15 Drawing Figures

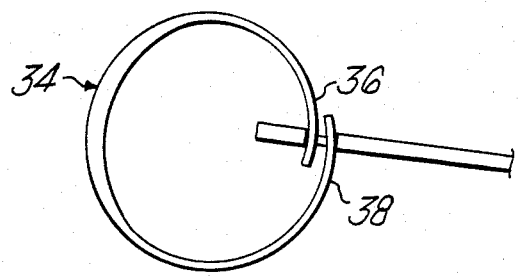
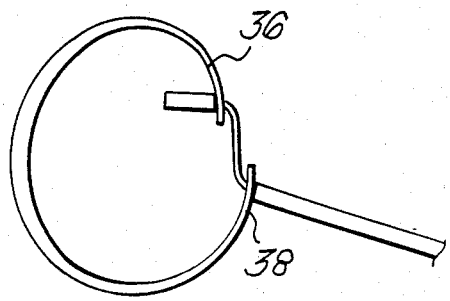
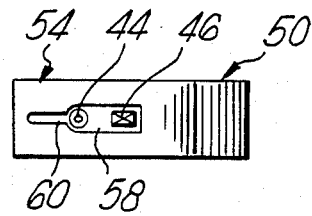
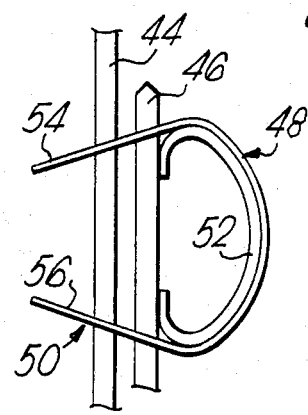
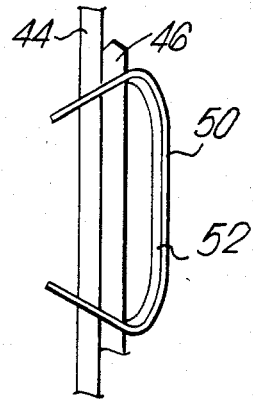

WIRE STRIPPING ARRANGEMENT

DESCRIPTION

This invention relates to a wire-stripping arrangement for stripping the insulation of an elongate insulated electrical conductor, and finds particular, though not exclusive, application in an electrical connector.

Attention is drawn to co-pending published British patent application No. 2090076 (the disclosure of which is incorporated herein by this reference), which is concerned with such arrangements and connectors. The said co-pending Application relates to connectors employing "recoverable" and "independently recoverable" means for stripping insulation.

A "recoverable" article is one whose dimensional configuration may be made to change when subjected to an appropriate treatment. Usually these articles recover towards an original shape from which they have previously been deformed but the term "recoverable", as used herein, also includes an article which adopts a new configuration, even if it has not been previously deformed. The article may be heat recoverable, such that its dimensional configuration may be made to change when subjected to heat treatment.

Examples of recoverable articles are given in U.S. Pat. Nos. 4,149,911, 4,221,457, 4,233,731 and 4,237,609.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensionally recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1440524, an elastomeric member such as an outer tubular member is held in a stretched state by a second member, such as an inner tubular member, which, upon heating weakens and thus allows the elastomeric member to recover.

Recoverable articles may also be formed from a "memory metal".

"Memory metals" sometimes also called "Memory Alloys" are metallic materials which exhibit changes in strength and configurational characteristics on passing through a transition temperature, in most cases the transition temperature between the martensitic and austenitic states, and can be used to make heat-recoverable articles by deforming an article made from them whilst the metal is in its martensitic, low temperature, state. The article will retain its deformed configuration until it is warmed above the transition temperature to the austenitic state when it will return or attempt to return towards its original configuration. It will be understood that the heat-recoverable article is capable of returning towards its original configuration without the further application of outside force. The deformation used to place the material in the heat-unstable configuration is commonly referred to as thermally recoverable plastic deformation and can also, in certain cases, be imparted by introducing strains into the article above the transition temperature, whereupon the article assumes the deformed configuration on cooling through the transition temperature. It should be understood that the transition temperature may be a temperature range and that, as hysteresis usually occurs, the precise temperature at which transition occurs may depend on whether the temperature is rising or falling. Furthermore, the transition temperature is a function of other parameters, including the stress applied to the material, the temperatures rising with increasing stress.

Amongst such memory metals there may especially be mentioned various alloys of titanium and nickel which are described, for example in U.S. Pat. Nos. 3,174,851, 3,351,463, 3,753,700, 3,759,552, British Pat. Nos. 1327441 and 1327442 and NASA Publication SP 110, "55-Nitinol-The Alloy with a Memory, etc." (U.S. Government Printing Office, Washington, D.C. 1972). The property of heat-recoverability has not, however, been solely confined to such titanium-nickel alloys. Thus, for example, various beta-brass alloys have been demonstrated to exhibit this property in, e.g. N. Nakanishi et al., Scripta Metallurgica 5 433–440 (Pergamon Press 1971), U.S. Pat. Nos. 3,783,037, 4,019,925, 4,144,104, 4,146,392 and 4,166,739, and such materials may be doped to lower their transition temperature to cryogenic regimes by known techniques. Similarly, 304 stainless steels have been shown to enjoy such characteristics E. Enami et al., id, at pp. 663–68.

In general these memory metals have a transition temperature within the range of from $-196°$ C. to $+135°$, especially from $-196°$ C. to $-70°$ C. (this being the lowest temperature they are liable to encounter during everyday use), and thus may be brought into their martensitic state by immersion into liquid nitrogen. However, more recently, it has been found possible to "precondition" memory metals so as transiently to raise their transition temperature. This enables the articles made from such alloys to be kept at room temperature prior to use, when they can be recovered by heating. Such preconditioning methods, which eliminate the need for liquid nitrogen during storage and transportation, are described, for example in U.S. Pat. Nos. 4,036,669, 4,067,752 and 4,095,999. A further method of treating such alloys in order to raise their effective transition temperature is described and claimed in U.S. Pat. No. 4,149,911.

As indicated above by application of a preconditioning process to a memory metal its transition temperature can be elevated. However, once recovery has been brought about by heating the article through its new transmission temperature, the memory metal's response to temperature change reverts to that it possessed prior to preconditioning. Accordingly, it remains austenitic until cooled to the temperature at which transition to martensite normally occurs, typically chosen to be at 0° C. or below depending upon the temperature environment likely to be encountered.

The above-mentioned co-pending Application is further concerned with "independently recoverable" articles. The term "independently recoverable" is used to refer to a recoverable article (of plastics or metal) that is held by its own molecular structure in a first state, changes being inducible within the molecular structure to cause the article to recover from the first state towards a second state.

The present invention relates to an arrangement that is "recoverable", and as used herein, this term is understood to include "independently recoverable".

Arrangements that are recoverable by heat are preferred for the present invention, but it is envisaged that other means of recovery, for example light or other radiant energy, or application of a fluid, may also be employed.

In accordance with the present invention, there is provided an arrangement for stripping the insulation of an elongate insulated electrical conductor, the arrangement comprising stripping members that co-operate to form an aperture, the aperture being of a size such as, in operation, to receive the insulated conductor, and the arrangement being recoverable to effect relative movement of the members (a) laterally of the conductor such that the aperture is effectively reduced in size and the walls of the members defining the reduced size aperture co-operate to pierce the insulation, and (b) longitudinally of the conductor such that a portion of the insulation is displaced from the conductor.

Reference to a reduction in the effective size of the aperture is understood to include not only a physical reduction in the cross-sectional area thereof, but also a reduction in the apparent size of the aperture as observed when looking along the length of the conductor. An example of the latter case is an arrangement in which a planar member containing the aperture with the conductor extending perpendicularly therethrough is rotated about an axis perpendicular to the conductor and lying in the plane of the member. It is further to be understood that although an "aperture" will generally be completely closed, in use, around the conductor, the term also extends to arrangements in which the conductor is not completely enclosed.

The relative movement of the stripping members "laterally" and "longitudinally" of the elongate conductor is understood to be in the general sense of to the side and along the length respectively of the conductor and not only strictly perpendicular and parallel respectively to its axis. Furthermore, "laterally" is understood to include movement in a plane that includes the conductor.

An insulated conductor is considered as having been stripped if the insulation is pierced, and preferably though not necessarily cut through to the conductor, either adjacent an end thereof (end stripping) or at an intermediate portion thereof (centre stripping), and displaced axially from the conductor, including but not being restricted to removal of the displaced insulation away from the conductor.

Advantageously, the relative movement of the two members is such that the lateral movement, arranged to cut through the insulation preferably up to the conductor, is substantially completed before the longitudinal movement, arranged to displace the insulation axially of the conductor, takes place.

Preferably each of the stripping members has a cut-out portion, which may or may not be open-ended, the aperture of the arrangement being formed by an overlap of the cut-out portions. Advantageously, each cut-out portion comprises a first part of such size as to receive, in operation, the insulated conductor and a second, smaller part, contiguous with said first part, arranged, on said recovery of the arrangement, to receive the bared conductor.

When the arrangement is recoverable by heat, the stripping operation is enhanced because of the softening of the insulation that consequently takes place.

The arrangement so far described is particularly, though not exclusively, useful for stripping the insulation from wires of a single gauge. The arrangement may, however, be modified so as conveniently to strip wires of a small gauge range and which have substantially the same thickness of insulation. Such a modification comprises means for sensing the outer diameter of an insulated conductor and means whereby associated stripping members are moved a predetermined amount in response to the sensed diameter such that the insulation is pierced up to the conductor.

Wire stripping arrangements, and their method of operation, each in accordance with the present invention, will now be described, by way of example, with reference to the accompanying drawings, in which:

FIGS. 7 and 8 are side elevations of the second embodiment in its before- and after-use states respectively;

FIG. 9 is an elevation of a third embodiment in a first, before-use state;

FIG. 10 is a plan of the third embodiment;

FIG. 11 is an elevation of the third embodiment in a second, after-use state.

Figure 1:
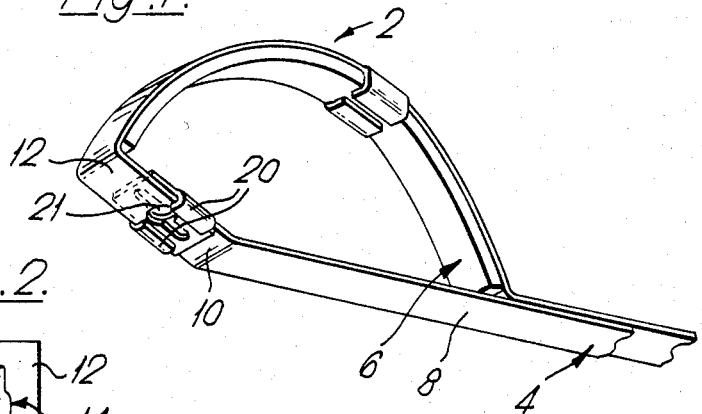
FIG. 1 is a perspective view of a first embodiment in a first, before-use state.
Figure 2:
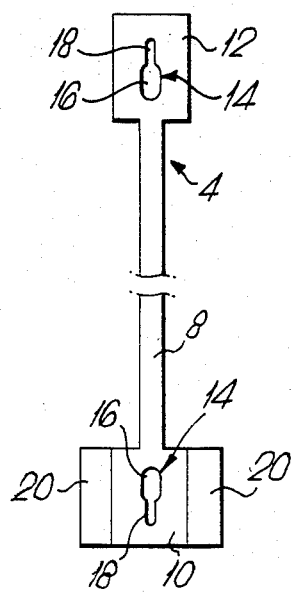
FIG. 2 is a plan of a component of the embodiment of FIG. 1.
Figure 3:
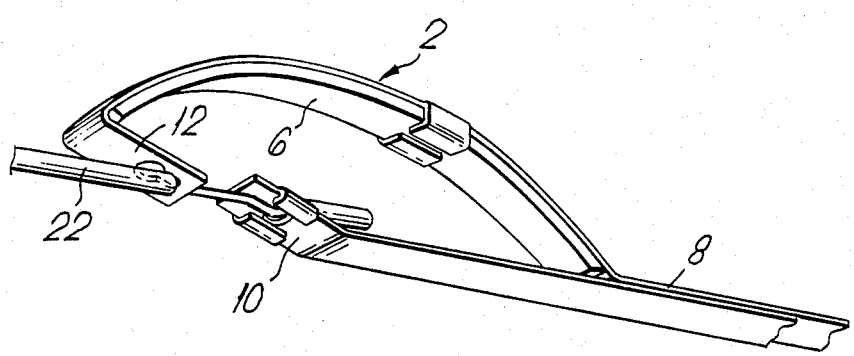
FIG. 3 is a view corresponding to that if FIG. 1 in a second, after-use state.

Referring to the embodiment of FIGS. 1 to 3, the wire stripping arrangement 2 shown therein consists of two components, a non-recoverable brass strip 4 and a recoverable beta-brass alloy 6. Referring in particular to FIG. 2, the brass strip 4 comprises an elongate intermediate portion 8 and two end, stripping members 10 and 12. Each stripping member 10, 12 has a cut-out portion 14 that is of relatively large dimension in a first portion 16 adjacent the intermediate strip portion 8 and a second, smaller dimension portion 18 contiguous therewith extending generally longitudinally of the strip 4. At least the edge defining the second portion 18 of the cut-outs 14 has an internal cutting edge. The strip 4 is shown in FIG. 2 in the form in which it is stamped from a brass blank, and the stripping member 10 has a larger lateral dimension than the stripping member 12. Each lateral extension 20 of member 10 is curled back over itself so as to form a channel, and the strip 4 is then looped on to itself, as can be seen in FIG. 1, with the stripping member 12 located within and retained by the channel of the stripping member 10.

The recoverable brass strip 6, which is appreciably curved in its first state, is clamped to the strip 4 within the looped portion thereof (FIG. 1). In the ready-for-use state of the arrangement 2 shown in FIG. 1, the overlap between the stripping members 10 and 12, with the member 12 retained within guide channels 20, is such that the first portions 16 of the cut-outs 14 lie over each other thereby defining an aperture 21. In this state, an insulated conductor 22 can pass freely through the aperture 21 of the arrangement. Upon heating the arrangement to effect recovery thereof, the beta-brass strip 6 tends to revert to its second state, which has a significantly increased radius of curvature with respect to that of its first state, and effects movement of the strip 4. During this movement, the stripping member 12 is urged away from the stripping member 10.

During the first part of the movement the member 12 is retained within the channel guides 20 so that relative movement between the stripping members is effected laterally of the conductor 22. As the stripping members 10 and 12 are urged away from each other, the conductor 22 is urged from the larger first portions into the smaller second portions of the cut-outs 14 which thereby pierce the conductor insulation. During the latter part of the movement, after the stripping member 12 has become disengaged from the channel guide 20, the members 10 and 12 move apart generally longitudinally of the conductor with the effect that the pierced insulation is displaced with respect to the bared conductor, as can be seen in FIG. 3.

It will be appreciated that the first part of the movement of the stripping members in response to recovery of the strip 6 causes the members 10 and 12 to slide over each other, and to pierce the insulation of the conductor 22 until the insulation is cut substantially completely through due to the fact that the overlap aperture between the cut-outs 14 at that stage is the overlap between the semi-circular ended portions 18, which provide a substantially circular aperture corresponding to the diameter of the bared conductor. The insulation is thus cut cleanly and, during the latter part of the movement, is comparatively easily moved along the conductor.

Since the stripping members 10 and 12 are electrically conductive it will be appreciated that the state shown in FIG. 3 has provided an electrical connection of the arrangement 2 on to the conductor 22, and connection to an external circuit may be conveniently made by suitable connection with the intermediate portion 8 of the strip 4.

Figure 4:
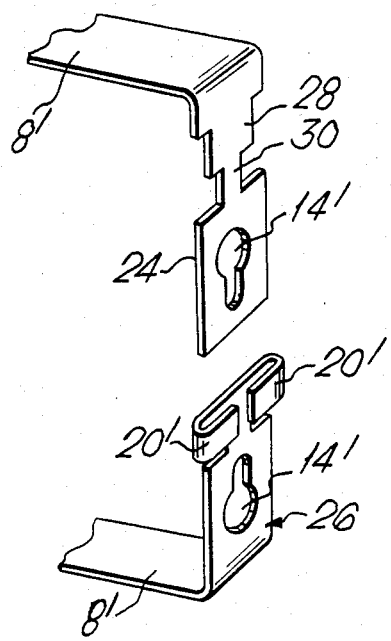
FIG. 4 is a perspective view of a first modification of part of the first embodiment.

FIG. 4 shows a modification of the stripping arrangement of FIG. 1 in which two stripping members 24, 26 have slightly different configurations from those of members 10 and 12. In this embodiment, the stripping member 24 has a first portion 28 of reduced transverse width and a second portion 30 of even further reduced transverse width, with respect to the width of the intermediate portion 8' of the brass strip. The stripping member 26 has a pair of channel guides 20' that are of width such as slidably to retain the stripping member 24 therein over its reduced width portion 28. However, when member 24 has slid away from the member 26, under action of a recoverable member (not shown), to an extent such that its reduced width portion 30 reaches the channel guides 20', the gap therebetween is sufficiently wide to allow the member 24 to move substantially perpendicularly to the member 26. It will be appreciated that these two movements would lead to piercing and then displacement of the insulation of a conductor disposed through the cut-outs 14' when they were in their overlapped position, as described above with reference to FIGS. 1 to 3, to provide a conductor-receiving aperture.

Figure 5:
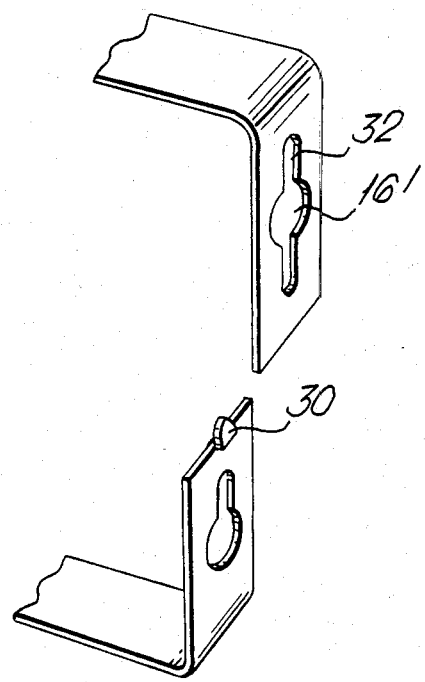
FIG. 5 is a perspective view of a second modification of part of the first embodiment.

A further modification of the stripping members of the stripping arrangement of FIG. 1 is disclosed in FIG. 5, in which a necked projection 30 on one of the members is slidably retained within a slot 32 of the other until the members have slidably moved apart far enough to effect the piercing of the insulation of an inserted conductor. At this stage the projection 30 enters the now-vacated first portion 16' of the cut-out of the other member, thereby to allow continued relative movement between the members in a direction substantially longitudinally of the conductor.

It will be appreciated that the stripping arrangement discussed with reference to FIGS. 1 to 5 is suitable for use as a connector whereby the intermediate portion of the arrangement forms or is part of one electrically conductive member and the conductor inserted through the aperture provided by the overlapped cut-out portions of the stripping members forms the other electrically conductive member of the connection.

Another embodiment of a wire stripping arrangement will now be described with reference to FIGS. 6 to 8, this arrangement being particularly suitable for receiving and inter-connecting two elongate insulated conductors.

Figure 6:
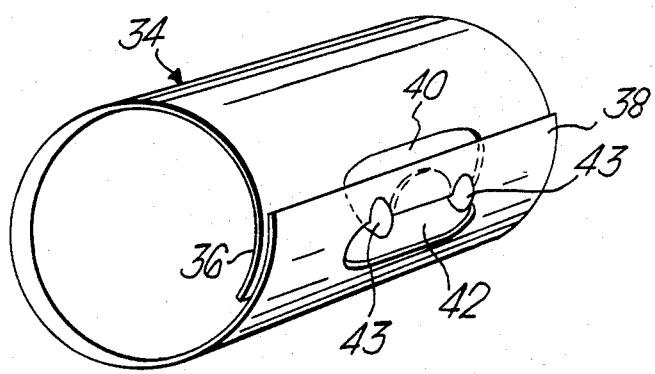
FIG. 6 is a diagrammatic view of a second embodiment in a first, before-use state.

FIG. 6 shows a strip 34 of memory metal, preferably beta-brass, that has been shaped into a generally cylindrical configuration with two ends 36, 38 thereof, forming stripping members, overlapping each other. The members 36 and 38 have similarly shaped cut-out portions 40, 42 therein, each of which is generally of the shape of a pair of the cut-outs 14, described above, that are placed side by side and merged together. In the condition shown in FIG. 6, in which the arrangement is supplied, the cut-outs 40 and 42 have two overlapping apertures 43 in their reduced section portions. It is arranged that the apertures 43 substantially correspond to the diameter of the bared conductors that are to be stripped, and are thus too small to allow insertion of insulated conductors therethrough into the arrangement. However, when the strip 34 is curled up to a slightly further extent, by hand pressure for example, it will be appreciated that the cut-outs 40 and 42 overlap in the regions of their larger portions, thus providing a single aperture of size sufficient to receive a pair of insulated conductors. Release of the additional pressure will allow the strip 34 to uncurl slightly thereby retaining the conductors, as can be seen from the side view of FIG. 7. Upon heating the strip 34 to achieve recovery thereof, the strip uncurls, causing the smaller, semi-circularly ended portions of the cut-outs 40 and 42 to penetrate the insulation of the conductors, and then to displace the pierced insulation, terminating in the configuration shown in FIG. 8.

As can be seen particularly from FIG. 7, the thickness of the strip 34 varies along its length, being at a minimum in the region of the stripping members so as to provide the most effective piercing of the insulation by the cut-outs 40 and 42, and being of increased thickness in its intermediate region, thereby to increase the force produced when the arrangement is heated to effect its recovery.

Another form of wire stripping arrangement will now be described with reference to FIGS. 9 to 11, being particularly suited for connecting a conductor to a wire wrap post extending, for example, from a printed circuit board.

FIG. 9 shows an insulated conductor 44 held loosely against a wire wrap post 46 by a wire stripping arrangement 48. The arrangement 48 consists of a brass strip 50 bent into a generally C-shape, and a memory metal strip 52 disposed therewithin and in abutment with the post 46. The ends 54, 56 of the strip 50 form similarly-shaped locating and stripping members, each being provided with a locating cut-out portion 58 shaped to be a sliding fit on the post 56, and a stripping cut-out portion, 60 contiguous therewith of the same general configuration as the cut-outs 14 of FIG. 1. Thus, the cut-outs 60 have an enlarged portion for receiving the insulated conductor 44 therethrough and a smaller diameter portion extending therefrom arranged, upon recovery of the stripping arrangement 48, to receive the bared conductor 44.

In operation, the stripping arrangement is heated to effect recovery of the memory metal element 52, and this is arranged to be transformed from its generally C-shape configuration as shown in FIG. 9, so as to open out to a much flatter shape as shown in FIG. 11. During this movement the conductor 44 has its insulation pierced by each of the cut-outs 60, and the pierced insulation is subsequently displaced as the stripping members 54 and 56 are forced apart longitudinally of the conductor 44. Consequently the conductor 44 is brought into contact with the post 46, which acts as a further stripping member in co-operation with each of the stripping members 54 and 56, and electrical connection is provided between the conductor, the post and the brass strip 50 of the stripping arrangement.

It will be appreciated that in each of the embodiments discussed above, electrical connection may be enhanced by providing solder 90, which term is understood to include fluxed solder, in the region over which the insulation of the conductor is stripped.

It is envisaged that the connections formed as disclosed above with the stripping arrangements may be protected, for example electrically insulated, by an enclosure 92 that envelops the stripping arrangement. Such an enclosure can advantageously be formed of a heat recoverable polymeric material, so that a single heating operation can then be effective to strip the conductor, effect electrical connection thereto, and provide electrical insulation of the connection.

Although in the embodiments of wire-stripping arrangements described with reference to FIGS. 1 to 5 and 9 to 11, the stripping members are not themselves recoverable but are operated by a separate recoverable member, it is envisaged that said members may be formed of a recoverable material, so that a separate recoverable material may be dispensed with. Analogously, it is envisaged that the embodiment described with reference to FIGS. 6 to 8 may comprise a non-recoverable member arranged to be activated by a separate, recoverable member. An advantage of having a recoverable member activate a non-recoverable stripping member is that each component can be individually selected for best performance. Thus, recoverable metals, which are difficult to machine, can be formed into relatively simple configurations and may be of a relatively soft material such as beta-brass, whilst a hard cutting edge may be provided on the separate, easily-machinable, stripping member.

Figure 12:
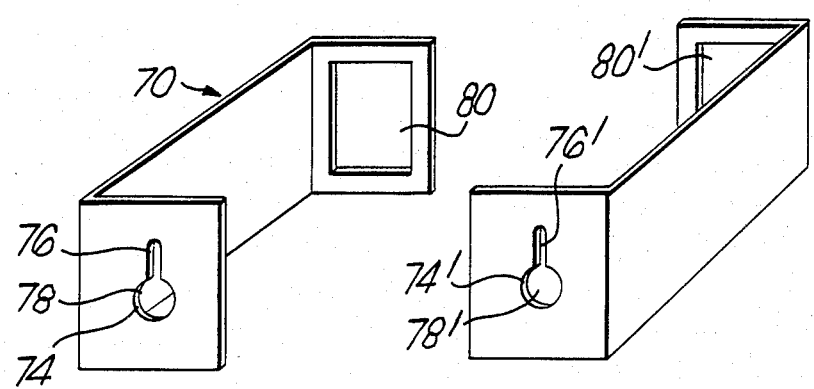
FIG. 12 is a perspective view of a co-operating pair of members for use with the wire-stripping arrangement to provide stripping of a range of wire gauges.
Figure 13:
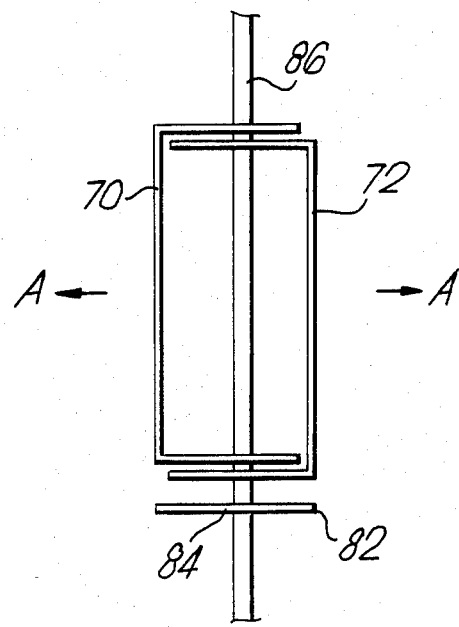
FIG. 13 is a plan view schematically showing the operation of the members of FIG. 12.
Figure 14:
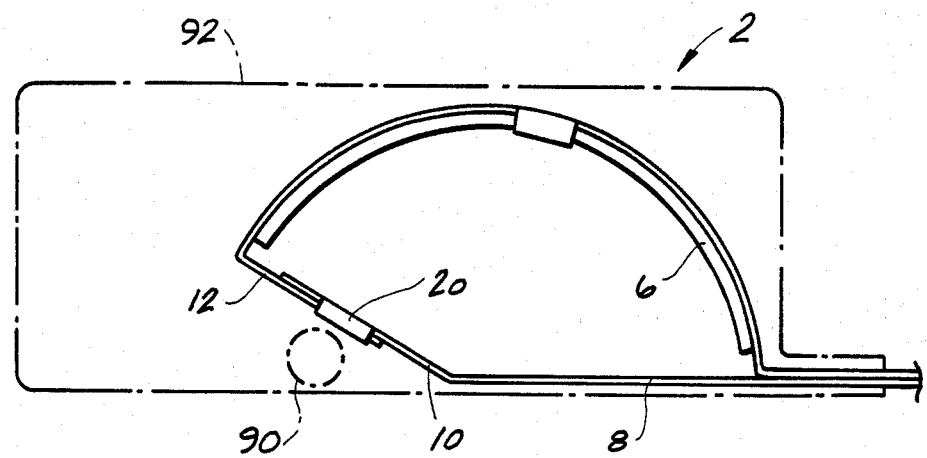
FIG. 14 is a side elevation of the embodiment of FIG. 1 further including solder and an enclosure in a first, before-use state.
Figure 15:
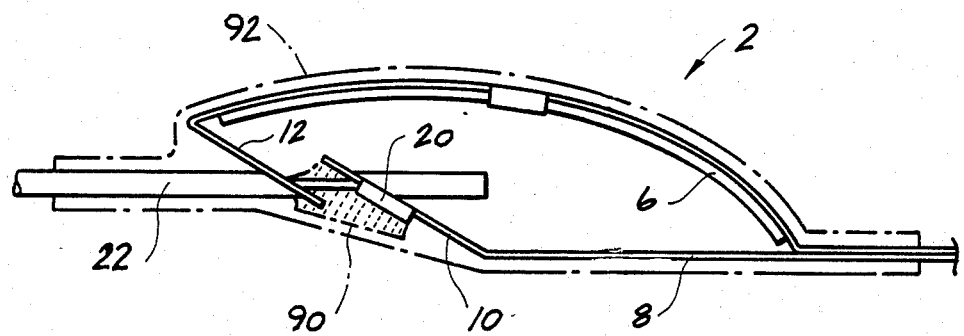
FIG. 15 is a view similar to FIG. 14 but in a second, after-use state.

It will be appreciated that the use of cut-out portions having overlapping semi-circular ends is particularly suitable for piercing completely the insulation of wires. This is of particular advantage with relatively hard insulation material. It is sometimes desirable, however, to provide complete, or even almost complete, insulation piercing of more than one gauge of wire with the same apparatus. FIGS. 12 and 13 show how the wire stripping arrangement of the present invention may be modified to this end.

Some wires have the same thickness of insulation for a limited gauge range, and advantage may be taken of this to provide the wire stripping arrangement, for example as embodied in FIGS. 1 to 11, with the capacity to pierce and strip insulation from a limited range of gauge wires.

FIG. 12 shows two complementary rigid ranging members 70, 72 that co-operate as shown in FIG. 13. The ranging member 70 will now be described in more detail, with corresponding features of the member 72 being denoted with primed numerals. The ranging member 70 has at one end a cut-out portion 74 that is similar to the cut-out portion 14 shown in FIG. 2. The narrow elongate part 76 of the portion 74 has an internal cutting edge, and extends away from a generally circular part 78. Spaced apart from, but parallel to, the portion 74, is a generally-rectangular ranging aperture 80 of the member 70.

The two ranging members 70, 72 are mounted (by means not shown), as can be seen from FIG. 13 such that the cut-out portions 74, 74' and 80, 80' overlap each other respectively and form one arm of a wire-stripping arrangement. The members are mounted so as to be relatively movable in the directions of the arrows A (FIG. 13). The other arm of the wire-stripping arrangement comprises a member 82 having a cut-out portion 84 that is similar to the cut-out portion 14 of FIG. 2 and that co-operates with the overlapped cut-out portions 74, 74' in a manner similar to that in which the two overlapping cut-out portions 14 co-operate as already described above.

An insulated conductor wire 86 is introduced into the members 70, 72 (FIG. 13), in a similar manner to the conductor 22 described with reference to FIGS. 1 to 3, so as to pass through the ranging apertures 80, 80'. The cut-out parts 76, 76' are initially overlapping in the direction A to an extent such that the resultant aperture is of smaller diameter than the diameter of the conductor of the wire. However, as the wire 86 is introduced into the cut-out parts 78, 78', the members 70 and 72 are forced apart in the direction A, and this movement continues until the resultant aperture of the overlapping portions 80, 80' is reduced to the diameter of the insulation of the wire 86. The members 70, 72 are so arranged, in dependence on the thickness of the insulation of the wire 86, that at this stage, the resultant aperture of the overlapping portions 76, 76' is increased to the diameter of the conductor of the wire 86. Accordingly, when the subsequent relative movement to effect stripping takes place between, on the one hand, the co-operating cut-out portions 74, 74' of the members 70, 72 and, on the other hand, the correspondingly (but inverted) shaped cut-out portion 84 of the wire-stripping member 82, the wire 86 is forced into the overlap aperture of the cut-out parts 76, 76' and pierced up to the diameter of its conductor, and subsequently displaced by relative axial movement of the member 82, in a manner similar to that described with reference to FIGS. 1 to 3.

By using two overlapping cut-out portions, therefore, in co-operation with a further cut-out portion that is simply arranged to accommodate the largest size wire to be stripped, a single arrangement may be employed to strip wire of more than one gauge. It will also be appreciated that the arrangement of co-operating ranging members may be used with stripping arrangements other than those hereinbefore described.

We claim:

1. An arrangement for stripping the insulation of an elongate, insulated electrical conductor, the arrangement comprising:
    at least two stripping members, each having a cut-out portion defined by an edge; and
    a recoverable member in cooperative engagement with each of said stripping members, said recoverable member having an original undeformed shape and a deformed shape wherein the original undeformed shape is recoverable from the deformed shape by application of heat thereto, said recoverable member being in the deformed shape;
    said stripping members positioned prior to recovery of the recoverable member opposed to one another with their cut-out portions aligned so as to form an aperture for receiving the conductor;
    the recovery of said recoverable member effecting relative movement of said stripping members (a) laterally of the conductor so that the aperture is effectively reduced in size, the edges of the cut-out portions penetrating the insulation of the insulated conductor, and (b) longitudinally of the conductor so that the edges of the cut-out portions cooperate to displace at least a portion of the insulation longitudinally of the conductor;
    wherein said stripping members are arranged to interengage each other such that said longitudinal movement is effected after said lateral movement has substantially been completed, wherein said interengagement is effected by one of said members being slidably disposed within a channel provided on the other of said members.

2. An arrangement for stripping the insulation of an elongate, insulated electrical conductor, the arrangement comprising:
    at least two stripping members, each having a cut-out portion defined by an edge; and
    a recoverable member in cooperative engagement with each of said stripping members, said recoverable member having an original undeformed shape and a deformed shape wherein the original undeformed shape is recoverable from the deformed shape by application of heat thereto, said recoverable member being in the deformed shape;
    said stripping members positioned prior to recovery of the recoverable member opposed to one another with their cut-out portions aligned so as to form an aperture for receiving the conductor;
    the recovery of said recoverable member effecting relative movement of said stripping members (a) laterally of the conductor so that the aperture is effectively reduced in size, the edges of the cut-out portions penetrating the insulation of the insulated conductor, and (b) longitudinally of the conductor so that the edges of the cut-out portions cooperate to displace at least a portion of the insulation longitudinally of the conductor;
    wherein said stripping members are arranged to interengage each other such that said longitudinal movement is effected after said lateral movement has substantially been completed, wherein said interengagement is effected by one of said members having a necked projection being slidably disposed within a slot provided on the other of said members.

3. An arrangement according to claim 1 or 2, wherein said members are formed integrally with each other.

4. An arrangement according to claim 1 or 2, wherein each of said cut-out portions comprises a first part of such size as to receive, in operation, the insulated conductor and a second, smaller part, extending from said first part in a direction opposite to the direction of lateral movement of said stripping members wherein upon the recovery of the arrangement, the second smaller part receives the bared conductor.

5. An arrangement according to claim 1 or 2, for stripping an insulated conductor of substantially circular cross-section, wherein each cut-out portion is generally elongate and each end thereof is of substantially semi-circular cross-section.

6. An arrangement according to claim 1 or 2, wherein at least one of said members is electrically conductive, and said movement, in use, produces a bared conductor which contacts the cut-out portion of the at least one of said electrically conductive members so as to provide an electrical connection between said conductive member and the conductor.

7. An arrangement according to claim 1 or 2, wherein at least one of said stripping members is formed at least in part from memory metal.

8. An arrangement according to claim 1 or 2, wherein said recoverable member is formed at least in part from memory metal.

9. An arrangement according to claim 1 or 2, comprising solder for enhancing, in use, an electrical connection to said conductor.

10. An arrangement according to claim 1 or 2, further comprising encapsulating means enveloping the arrangement, in use, to protect the bared conductor.

11. An arrangement according to claim 10, wherein the encapsulating means effects electrical insulation of the stripped conductor.

12. An arrangement according to claim 10, wherein the encapsulating means comprises recoverable, polymeric material.

13. An arrangement according to claim 12, wherein the polymeric material is heat recoverable.

14. An arrangement according to claim 1 or 2, comprising means arranged to reduce the size of said aperture in dependence on the thickness of the insulation of the conductor.

* * * * *

UNITED STATES PATENT AND TRADEMARK OFFICE
CERTIFICATE OF CORRECTION

PATENT NO. : 4,510,827
DATED : April 16, 1985
INVENTOR(S) : Regis Flot/Jean Patrick Hine It is certified that error appears in the above-identified patent and that said Letters Patent are hereby corrected as shown below:

In the specification column 7, line 65 change "material" to read --member--

In claim 9, after "claim 1 or 2," add --further--

Signed and Sealed this

Third Day of June 1986

[SEAL]

Attest:

DONALD J. QUIGG

Attesting Officer

Commissioner of Patents and Trademarks